(12) United States Patent
Henze et al.

(10) Patent No.: US 7,595,735 B2
(45) Date of Patent: Sep. 29, 2009

(54) SEAT OCCUPANCY SENSOR

(75) Inventors: Karsten Henze, Munich (DE); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 11/802,908

(22) Filed: May 25, 2007

(65) Prior Publication Data

US 2007/0285268 A1 Dec. 13, 2007

Related U.S. Application Data

(63) Continuation of application No. PCT/EP2005/009916, filed on Sep. 15, 2005.

(30) Foreign Application Priority Data

Nov. 29, 2004 (DE) .................. 10 2004 057 600

(51) Int. Cl.
*G08B 21/00* (2006.01)

(52) U.S. Cl. .................. 340/667; 324/207.19; 280/735

(58) Field of Classification Search ................ 340/667; 324/207.19–207.26; 307/112; 73/715, 719, 73/753; 280/735, 801.1
See application file for complete search history.

(56) References Cited

U.S. PATENT DOCUMENTS

| | | | |
|---|---|---|---|
| 4,336,522 A * | 6/1982 | Graham | ..................... 340/459 |
| 6,348,663 B1 | 2/2002 | Schoos et al. | |
| 6,522,155 B2 * | 2/2003 | Pietsch et al. | ............... 324/691 |
| 6,693,549 B2 | 2/2004 | Stuetzler | |
| 6,707,694 B2 * | 3/2004 | Regev | ..................... 365/49.17 |
| 7,343,807 B2 * | 3/2008 | Lorenz | ........................ 73/715 |
| 2002/0163171 A1 * | 11/2002 | Kraft et al. | .................. 280/735 |

FOREIGN PATENT DOCUMENTS

| | | |
|---|---|---|
| DE | 42 37 072 CL | 12/1993 |
| DE | 199 06 932 A1 | 8/2000 |
| DE | 100 03 992 A1 | 8/2001 |
| DE | 10 2004 002 479 A1 | 8/2005 |
| DE | 10 2004 015 408 A1 | 10/2005 |
| EP | 0 891 898 B1 | 1/1999 |
| JP | 11-297153 A | 10/1999 |

OTHER PUBLICATIONS

International Search Report dated Dec. 9, 2005 with English translation (Six (6) pages).
German Search Report dated Jan. 15, 2007 with English translation of pertinent portion (Nine (9) pages).

* cited by examiner

*Primary Examiner*—Davetta W Goins
*Assistant Examiner*—Hoi C Lau
(74) *Attorney, Agent, or Firm*—Crowell & Moring LLP

(57) ABSTRACT

A seat occupancy sensor has at least two pressure-activatable switch elements, which are assigned to two areas of a seat and are spaced a distance apart from one another and connected in a logic AND operation arrangement. An electric resistance element is connected in parallel to each switch element, its resistance value being between the resistance values when the switch element is activated and when the switch element is not activated. Each switch element can have a plurality of parallel connected sensor cells interconnected in a logic OR operation arrangement and distributed over a zone of the seat so that occupancy at any location within this zone is recognized as seat occupancy by one of the sensor's switch elements.

19 Claims, 1 Drawing Sheet

| | From | To | |
|---|---|---|---|
| Short circuit | 0 ohm | 1,124 ohm | Fault |
| Occupied | 1,125 ohm | 1,800 ohm | OK |
| Unoccupied (partial load, only SW1-3 or SW4-6) | 6,904 ohm | 7,054 ohm | OK |
| Unoccupied | | 9,735 ohm | OK |
| Interrupt (internal, internal conductor) | | 17,991 ohm | Fault |
| Interrupt (internal, external conductor) | | 21,188 ohm | Fault |
| Interrupt (feeder line) | | - ohm | Fault |

SEAT OCCUPANCY SENSOR

CROSS-REFERENCE TO RELATED APPLICATIONS

This application is a continuation of PCT International Application No. PCT/EP2005/009916, filed on Sep. 15, 2005, which claims priority under 35 U.S.C. §119 to German Application No. DE 10 2004 057 600.9, filed Nov. 29, 2004, the entire disclosures of which are expressly incorporated by reference herein.

BACKGROUND AND SUMMARY OF THE INVENTION

The present invention relates to a seat occupancy sensor, and in particular, a sensor for detecting seat occupancy in a vehicle.

One type of a seat occupancy sensor is known from German Patent Application 10 2004 015 408.2 that is usable especially in non-safety-critical applications, e.g., a seat belt warning system, to warn a passenger sitting on the vehicle seat to fasten his/her seat belt. Such a warning system outputs an acoustic or optical signal, for example, when the vehicle seat is occupied but the belt lock of the respective seat belt has not yet been fastened. The seat belt sensor in such a system essentially differentiates between seat occupancy by a passenger and seat occupancy by an object, such as a handbag. A more complex classification of seat occupancy is not used.

An object of the present invention is to provide a functional diagnosis in connection with a seat occupancy sensor.

This object is achieved according to the present invention by a seat occupancy sensor having two pressure-activatable switch elements assigned to two areas of a seat spaced a distance apart from one another and connected in a logic AND operation arrangement. An electric resistance element is connected in parallel to each switch element, with the resistance value of each resistance element being between the resistance value with an activated switch element and the resistance value with an unactivated switch element. The first and second switch elements may be connected in series, and the first and/or second switch element may include a plurality of individual sensor cells interconnected in a logic OR operation arrangement.

In the simplest case, the electric resistance of the switch elements is zero for an activated switch (switch closed) and is infinite for a deactivated switch (switch open). Without the embodiment according to the present invention, it would be impossible to differentiate between a line interruption and the deactivated state. If the logic AND operation is implemented by a series connection of the two switch elements, this yields unique values for the total resistance of the seat occupancy sensor. These values are usually clearly differentiable from one another in the event of a fault and in the event of proper functioning in the four possible operating states, namely: only one or the other switch is activated, both are deactivated, or both are activated.

In one embodiment, the first and second switch elements are connected in series with the electric resistance element connected in parallel to each switch element.

It should be pointed out that the seat occupancy sensor may have more than two switch elements. For example, three or more switch elements may be wired in a logic AND operation. Alternatively, several groups of two or more switch elements may be provided in an AND operation.

In a preferred embodiment of the invention, the first and/or second switch elements include a plurality of individual switch cells that are interconnected in such a way as to implement a logic OR operation. The individual switch cells of the switch elements may be wired in parallel, for example. The wiring of the individual switch cells in an OR operation causes the switch elements to be triggered when a single switch cell is triggered by a pressure force. If the individual switch cells are arranged so they are distributed in a cluster over a certain zone of the vehicle seat, then this zone constitutes the active area of the respective switch elements. Occupancy at any location within this zone is thus recognized as occupancy by the switch element.

Other objects, advantages and novel features of the present invention will become apparent from the following detailed description of the invention when considered in conjunction with the accompanying drawings.

DETAILED DESCRIPTION OF THE DRAWINGS

Figures 1, 2:
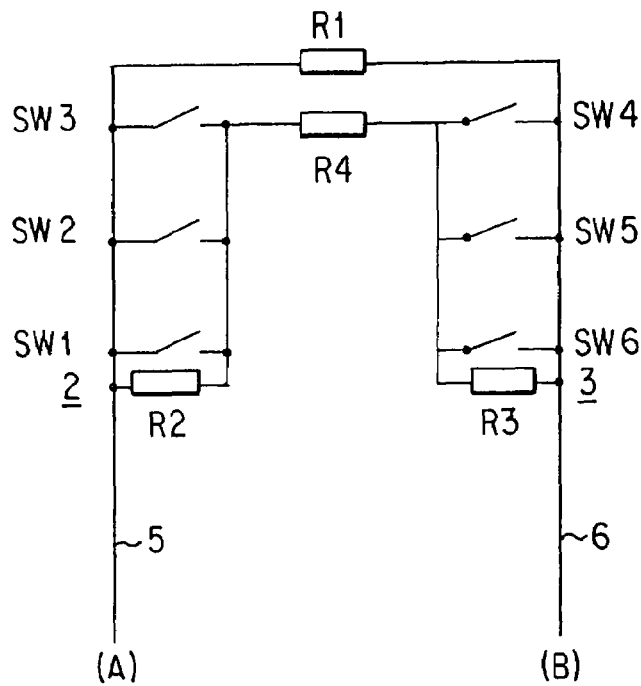
FIG. 1 shows a circuit diagram of an embodiment of a seat occupancy sensor according to the invention.
FIG. 2 is a table listing a range of resistance values of the sensor for various conditions.

Referring to FIG. 1, two switch elements 2 and 3 each have a plurality of sensor cells SW1, SW2, SW3 and/or SW4, SW5 and SW6, respectively, contained in the seat surface (not shown) of a seat (also not shown). Sensor cells SW1 through SW6 are drawn as simple switches whose resistance value in the activated state, i.e., when the area associated with a particular sensor cell is occupied, is equal to zero and in the deactivated case, i.e., when the area associated with a particular sensor cell is not occupied, is infinite.

The switch element 2 is arranged to the left of a seat center line (not shown) as viewed in the direction of travel, and the switch element 3 is arranged to the right of the seat center line as viewed in the direction of travel.

Sensor cells SW1, SW2, SW3 on the left side and sensor cells SW4, SW5, SW6 on the right side are each wired in a parallel circuit, so that a logic OR operation is implemented for the sensor cells of each switch element. The two switch elements 2 and 3 are, in turn, connected in series between two terminal leads 5 and 6, thus yielding a logic AND operation. The terminal leads 5 and 6 go to a control unit (not shown), the terminals of which are labeled as A and B.

When a person sits down on the seat, pressure is applied to at least one of the sensor cells and its resistance is reduced from a very high value (theoretically infinitely high) to a lower value that is a function of the applied pressure, approaching zero. This change in resistance results in the total resistance of the circuitry of the AND operation, comprising the two switch elements 2 and 3, also being reduced, such as to a value equal to or close to zero. For the functional diagnosis, an electric resistance element R2 and/or R3 is connected in parallel to each of the switch elements 2 and 3, and another resistor R4 is connected between the two switch elements. An electric line 7 in which there is an electric resistor R1 runs parallel to the switch elements 2 and 3. In one embodiment, approximate resistance values for the resistors R1 through R4 are given in the following table:

| | |
|---|---|
| R1 | 18 000 Ohm |
| R2 | 10 000 Ohm |

-continued

| | |
|---|---|
| R3 | 10 000 Ohm |
| R4 | 1 200 ohm |

With proper functioning of the sensor or with a line interruption, a total resistance value as listed in the table of FIG. 2 is obtained at the ends of lines 5 and 6, labeled as A and B in FIG. 1. The values in the table are resistance values of the sensor under various conditions such as load, faults, etc. Partial load here means that only one of the two switch elements 2, 3, and at least one of the sensor cells SW1, SW2 and/or SW3 and/or SW4, SW5 and/or SW6, is closed.

Due to the values of the total resistance which are different from one another in any case, as shown in FIG. 2, it is possible to perform a functional test of the seat occupancy pressure sensor with good accuracy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat occupancy sensor, comprising:
a first pressure-activatable switch element and a second pressure activatable switch element assigned to two areas of a seat spaced a distance apart from one another and connected by a logic AND operation; and
a first resistance element having a first resistance value and a second resistance element having a second resistance value, each resistance element being connected in parallel to a respective switch element,
wherein said first resistance value is between a resistance value with an activated first switch element and a resistance value with an un-activated first switch element, and said second resistance value is between a resistance value with an activated second switch element and a resistance value with an un-activated second switch element; wherein each of said first and second pressure-activatable switch elements comprises a plurality of individual sensor cells interconnected in a logic OR operation arrangement.

2. The seat occupancy sensor of claim 1, wherein said first and said second switch elements are connected in series.

3. The seat occupancy sensor of claim 1, wherein at least one of said first switch element and said second switch element comprises a plurality of individual sensor cells interconnected in a logic OR operation arrangement.

4. The seat occupancy sensor of claim 2, wherein at least one of said first switch element and said second switch element comprises a plurality of individual sensor cells interconnected in a logic OR operation arrangement.

5. The seat occupancy sensor of claim 1 wherein said first resistance value and said second resistance value are the same.

6. The seat occupancy sensor of claim 2 wherein said first resistance value and said second resistance value are the same.

7. The seat occupancy sensor of claim 3 wherein said first resistance value and said second resistance value are the same.

8. The seat occupancy sensor of claim 4 wherein said first resistance value and said second resistance value are the same.

9. The seat occupancy sensor of claim 5, further comprising an electric resistor connected in parallel with both said first and second switch elements and having a resistor value of at least approximately equal to a sum of said first and said second resistance values.

10. A vehicle comprising a seat with a sensor for detecting a seat occupancy wherein said sensor comprises:
at least two pressure activatable switch elements positioned beneath said seat, spaced apart from one another and connected in a logic AND operation arrangement; and,
a resistance element connected in parallel with each of said at least two pressure activatable switch elements; wherein each of said at least two pressure activatable switch elements comprises a plurality of individual sensor cells interconnected in a logic OR operation arrangement.

11. The vehicle comprising a seat with a sensor for detecting a seat occupancy as in claim 10, wherein each said resistance element associated with one of said at least two pressure activatable switch elements has a resistance value between a resistance value with an associated activated switch element, and a resistance value with an associated un-activated switch element.

12. The vehicle comprising a seat with a sensor for detecting a seat occupancy as in claim 10, wherein each of said at least two pressure activatable switch elements comprises a plurality of individual sensor cells interconnected in a logic OR operation arrangement.

13. A method for determining an occupancy of a seat, the method comprising the acts of:
arranging an occupancy sensor comprising two pressure-activatable switch elements in a spaced-apart relationship, connected by a logic AND circuit, and having a resistance element connected in parallel with each of said two pressure-activatable switch elements;
connecting two terminal leads to said occupancy sensor by connecting a lead to each switch element such that said two pressure-activatable switch elements are in series with said two terminal leads;
positioning said occupancy sensor beneath a surface area of said seat; and
measuring a resistance between said two terminal leads to determine the occupancy of said seat; wherein each of said two pressure-activatable switch elements comprises a plurality of individual sensor cells interconnected in a logic OR operation arrangement.

14. The method of claim 13 further comprising the act of:
interconnecting a plurality of individual sensor cells in a logic OR operation arrangement as at least a part of each switch element.

15. The method of claim 13, further comprising the act of distributing the plurality of switch elements over an area under said seat.

16. The method of claim 15, further comprising the act of arranging said plurality of individual sensor cells in each switch element at predetermination locations over an area under said seat.

17. A pressure sensor, comprising:
a plurality of pressure-activatable switch elements spaced a predetermined distance from one another and connected by a logic AND operation,
a plurality of electric resistance elements each having a resistance value, with each one of said plurality of electric resistance elements being respectively associated with, and connected in parallel to, a respective one of said plurality of pressure-activatable switch elements, wherein said resistance value of each of said plurality of electric resistance elements is between a resistance value of an associated activated paralleled switch element and an associated un-activated paralleled switch element; wherein each of said plurality of pressure-activatable switch elements comprises a plurality of individual sensor cells interconnected in a logic OR operation arrangement.

18. The pressure sensor as in claim 17, wherein the plurality of pressure-activatable switch elements are connected in series.

19. A seat occupancy sensor comprising:

a plurality of switch elements connected in series between two sensor terminal leads for operation as an AND gate for an output change measured between said terminal leads a plurality of electric resistance elements each having a resistance value, with each one of said plurality of electric resistance elements being respectively associated with, and connected in parallel to, a respective one of said plurality of switch elements; and a plurality of sensor cells contained within each switch element, said plurality of sensor cells being connected in parallel between an input and an output of each of said plurality of switch elements for operation as an OR gate for an output change of any switch element; wherein, a seat occupancy status is determined by a resistance measured between said terminal leads.

* * * * *